(12) United States Patent
Seyrling et al.

(10) Patent No.: US 11,453,586 B2
(45) Date of Patent: Sep. 27, 2022

(54) METHOD FOR CONTROLLING AN OZONE GENERATING MACHINE

(71) Applicant: SUEZ GROUPE, Paris la Defense (FR)

(72) Inventors: Sieghard Seyrling, Zurich (CH); Marco Tremblay, Montreal (CA); Luca Ramoino, Uster (CH)

(73) Assignee: Suez Groupe SAS, Paris (FR)

(*) Notice: Subject to any disclaimer, the term of this patent is extended or adjusted under 35 U.S.C. 154(b) by 0 days.

(21) Appl. No.: 16/622,907

(22) PCT Filed: Jun. 29, 2018

(86) PCT No.: PCT/EP2018/067517
§ 371 (c)(1),
(2) Date: Dec. 13, 2019

(87) PCT Pub. No.: WO2019/002527
PCT Pub. Date: Jan. 3, 2019

(65) Prior Publication Data
US 2020/0115229 A1  Apr. 16, 2020

(30) Foreign Application Priority Data

Jun. 30, 2017 (EP) .................................. 17305834

(51) Int. Cl.
*C01B 13/11* (2006.01)
*H01T 23/00* (2006.01)

(52) U.S. Cl.
CPC ............ *C01B 13/115* (2013.01); *H01T 23/00* (2013.01); *C01B 2201/32* (2013.01); *C01B 2201/90* (2013.01)

(58) Field of Classification Search
CPC ............... C01B 13/115; C01B 2201/32; C01B 2201/90; C01B 13/11; C01B 2201/64;
(Continued)

(56) References Cited

U.S. PATENT DOCUMENTS 3,899,684 A  8/1975  Tenney
6,372,096 B1  4/2002  Ditzler
(Continued)

OTHER PUBLICATIONS

International Search Report completed Aug. 16, 2018; 2 pages.

*Primary Examiner* — Xiuyu Tai
(74) *Attorney, Agent, or Firm* — Landmark Intellectual Property Law; Gregory M Murphy

(57) ABSTRACT

A method for producing ozone in an ozone generating machine, including the steps of: supplying feed gas containing dioxygen at a gas inlet (O2IN) of an ozone generator (OzG), at a given feed gas flow and feed gas pressure; supplying an alternating electric current so as to create electric discharges to generate a given amount of ozone at a gas outlet (O3OUT) of the ozone generator (OzG); adjusting electric current power and at least one of a plurality of process parameters comprising; characterized in that the method includes, during ozone production, the steps of: monitoring electric power and said at least one parameter of the plurality of process parameters; and adjusting the feed gas pressure in response to the adjustment of the electric current power and said at least one process parameter.

10 Claims, 2 Drawing Sheets

(58) Field of Classification Search
CPC .......... C01B 2201/76; C01B 2201/40; C01B 2201/14; C01B 13/10; C01B 2201/12; C01B 2201/24; C01B 2201/22; C01B 2201/34; C01B 2201/74; H01T 23/00; B01J 19/088; B01J 2219/0805; B01J 4/008; B01J 2219/00162; B01J 2219/00038; B01J 2219/00164; G05D 11/138; Y10T 137/0318; Y10T 29/49124; Y10T 29/49155

See application file for complete search history.

(56) References Cited

U.S. PATENT DOCUMENTS

| | | | |
|---|---|---|---|
| 2007/0020160 A1* | 1/2007 | Berkman | C01B 13/11 422/186.14 |
| 2012/0219460 A1 | 8/2012 | Okihara et al. | |
| 2012/0308440 A1* | 12/2012 | Owens | C01B 13/11 422/186.07 |

* cited by examiner

METHOD FOR CONTROLLING AN OZONE GENERATING MACHINE

CROSS-REFERENCE TO RELATED APPLICATIONS

The present application is a National Phase Application claiming priority to PCT/EP2018/067517 filed on 29 Jun. 2018, which claims priority to European Patent Application No. 17305834.8, filed on 30 Jun. 2017, each of which is incorporated by reference in its entirety.

FIELD OF THE INVENTION

The present invention relates to a method for controlling an ozone generating machine, and is directed in particular to an ozone generating machine comprising an ozone generator with at least two electrodes separated by a ozonizing gap and a dielectric layer, and coupled to an electric power unit to generate electric discharges in a gas containing dioxygen and flowing in the ozonizing gap.

BACKGROUND OF THE INVENTION

Document U.S. Pat. No. 8,728,402B2 describes an example of ozone generating machine comprising at least two electrodes. However, such machine, while generating a given amount of ozone (at a given concentration and given output gas flow), might be set to deliver another amount of ozone. In such case, the electric power supplied to the electrodes and/or the inlet gas flow are changed to reach the new production target. However, the efficiency of the method disclosed in this document might be increased.

BRIEF SUMMARY OF THE INVENTION

The present invention aims to address the above mentioned drawbacks of the prior art, and to propose first a method for controlling an ozone generating machine comprising at least two electrodes, so as to enhance the efficiency of ozone production (in terms of electricity costs or raw material costs), even when productions ranges are changed.

In this aim, a first aspect of the invention is a method for producing ozone in an ozone generating machine comprising at least two electrodes separated by an ozonizing gap and a dielectric layer, and located in an ozone generator comprising at least a gas inlet for receiving a feed gas containing dioxygen, and a gas outlet for exhausting gas comprising ozone, the method comprising the steps of:

(i) supplying the feed gas containing dioxygen at the gas inlet of the ozone generator, at a given feed gas flow and feed gas pressure;

(ii) supplying an alternating electric current to said at least two electrodes of the ozone generator so as to create electric discharges in the ozonizing gap, to generate a given amount of ozone at the gas outlet of the ozone generator; and (iii) adjusting electric current power and at least one of a plurality of process parameters comprising feed gas flow, electric current frequency, electric current voltage, cooling temperature of the ozone generator, to adjust the amount of generated ozone at the gas outlet of the ozone generator.

Characterized in that the method comprises, during ozone production, the steps of:

(i) monitoring electric power and said at least one parameter of the plurality of process parameters comprising feed gas flow, electric current frequency, electric current voltage, cooling temperature; and (ii) adjusting the feed gas pressure in response to the adjustment of the electric current power and said at least one process parameter. According to the above method, the process parameters are monitored during all the production, and the gas feed pressure is adjusted, in addition to an adjustment of electric power with another process parameter. This gas feed pressure adjustment is done to enhance the overall efficiency of ozone production, which is typically a quantity of generated ozone compared with an electric power consumption (also called ozone yield or specific energy consumption). In other words, the method comprises a step of gas feed pressure adjustment to put the production conditions in an optimized configuration, so as to decrease the production costs.

In particular, the cooling temperature of the ozone generator is a temperature of a cooling liquid entering a cooling path of the ozone generator. The cooling path is part of a cooling circuit typically comprising the cooling path of the ozone generator, a pump and a heat exchanger. The cooling liquid might be water, optionally containing additives (against corrosion, freezing . . . ).

In particular, an adjustment of electric current power is an adjustment of electric power density (kW per square meter of electrode).

Advantageously, the step of adjusting the feed gas pressure comprises:

(i) a step of calculating a derivative with respect to feed gas pressure of a model predicting a performance of the ozone generator based on feed gas pressure, electric current power and said at least one of the said process parameters, to determine an optimum feed gas pressure leading to an optimized efficiency of the ozone generator operated with the adjusted value of electric current power and said at least one adjusted process parameter; and (ii) adjusting the feed gas pressure to reach the optimum gas feed pressure within the ozone generator. According to this embodiment, the adjustment of gas feed pressure is done according to a prediction model, which gives for the adjusted values of electric power and the said at least one parameter, an optimum value for gas feed pressure to end in the most efficient production of ozone. Such model can be an empirical model, but it might also be established by a deep neural network during a learning phase, or it might be also a model driven by fuzzy logic.

Advantageously, the method comprises a step of monitoring the generated amount of ozone at the gas outlet of the ozone generator by measuring an ozone concentration and/or measuring a flow of gas flowing through the ozone generator. This measurement step is typically the basis for accurate calculation of ozone concentration (with flow and pressure measurements). Typically, any ozone generating machine is by default equipped with such sensor, or if not, an ozone concentration sensor can be easily added to the installation.

Advantageously, the steps of calculating the optimum feed gas pressure and adjusting the feed gas pressure are performed simultaneously to, or within a predetermined operating time following a change in electric current power or said at least one parameter of the plurality of process parameters. In other words, the gas feed pressure is adjusted on the go, during the production, as soon as there is a change to adjust the amount of generated ozone.

Advantageously, an adjustment of electric current power is an adjustment of electric current frequency. Indeed, the electric current power might be adjusted by a change in the frequency. In such case, the other parameter to be adjusted is another process parameter than the frequency: it might be feed gas flow, cooling temperature. . . .

Advantageously, only the electric current frequency and the feed gas flow are adjusted, and:

(i) an increase of electric current frequency leads to an increase of feed gas pressure, (ii) a decrease of electric current frequency leads to a decrease of feed gas pressure. These changes in gas feed pressure lead to enhance the efficiency.

Advantageously, an adjustment electric power is an adjustment of electric current voltage. Indeed, the electric current power might be adjusted by a change in the current voltage (also called voltage amplitude or peak voltage). In such case, the other parameter to be adjusted is another process parameter than the voltage: it might be feed gas flow, cooling temperature.

Advantageously, only the electric current voltage and the feed gas flow are adjusted, and wherein:

(i) an increase of electric current voltage leads to an increase of feed gas pressure; and (ii) a decrease of electric current voltage leads to a decrease of feed gas pressure. These changes in gas feed pressure lead to enhance the efficiency.

Advantageously, the absolute gas pressure in the ozone generator is varied in a range of [0.5 bar(a)-6 bar(a)].

Advantageously, the ozone generating machine comprises a pressure regulator connected to the ozone generator, and the step of adjusting the feed gas pressure in the ozone generator comprises a step of controlling the pressure regulator.

Advantageously, the ozone generating machine comprises an electric power unit connected to the at least two electrodes of the ozone generator, and the step of adjusting the electric power supplied to the electrodes comprises a step of controlling the electric power unit.

Advantageously, the ozone generating machine comprises a flow regulator connected to the ozone generator, and the step of adjusting the feed gas flow comprises a step of controlling the flow regulator.

Advantageously, the step of supplying feed gas at the gas inlet of the ozone generator is a step consisting in supplying a gas containing at least 95% of dioxygen gas.

Advantageously, the step of supplying dioxygen gas at the gas inlet of the ozone generator is a step consisting in supplying a gas containing no more than 5% of nitrogen gas or argon gas.

Advantageously, the step of supplying feed gas at the gas inlet of the ozone generator is a step consisting in supplying air.

Advantageously, the method comprises the steps of:
(i) monitoring the generated amount of ozone;
(ii) monitoring the feed gas pressure;
(iii) monitoring an amount of electricity consumed;
(iv) calculating and/or measuring and monitoring an ozone yield based on the generated amount of ozone and the amount of electricity consumed;
(v) comparing the ozone yield before and after the step of adjusting the gas feed pressure; and
(vi) reiterating the step of adjusting the feed gas pressure if ozone yield is decreased after the step of adjusting the gas feed pressure, so as to optimize the ozone yield.

According to the above embodiment, the effect of adjusting the feed gas pressure is checked (by calculation, or based on measurement of ozone concentration, gas flow/gas pressure), and a further adjustment is done if there is a loss of efficiency (loss of ozone yield). The adjustment can be set according to a "try and test" strategy, to screen the operating range, so as to find the optimum gas feed pressure by trial and error. It might also be based on the instructions given by a deep neural network, or basic calculations from a predicting model, or from fuzzy logic calculations.

Advantageously, the method comprises the step of further adjusting the feed gas pressure if ozone yield is increased or is the same after the step of adjusting the gas feed pressure, so as to further increase the ozone yield.

Advantageously, the method comprises the step of maintaining the feed gas pressure if ozone yield is increased or is the same after the step of adjusting the gas feed pressure. The optimum conditions are maintained once reached, to produce ozone in the most efficient conditions.

A second aspect of the invention relates to an ozone generating machine comprising:

(i) an ozone generator comprising an inlet for receiving feed gas containing dioxygen, and an outlet for exhausting gas comprising ozone;

(ii) at least two electrodes located in the ozone generator and separated by an ozonizing gap and a dielectric layer;

(iii) a pressure regulator connected to the ozone generator;

(iv) an electric power unit connected to the at least two electrodes;

(v) a flow regulator connected to the ozone generator; and (vi) a control unit arranged to control said pressure regulator, electric power unit, flow regulator, so as to implement the method according to the first aspect.

In an embodiment, the electrodes are metallic, and the dielectric layer comprises a ceramic coating, applied onto at least one of the electrodes.

DESCRIPTION OF THE DRAWINGS

Other features and advantages of the present invention will appear more clearly from the following detailed description of particular non-limitative examples of the invention, illustrated by the appended drawings where.

DETAILED DESCRIPTION OF THE INVENTION

Figure 1:
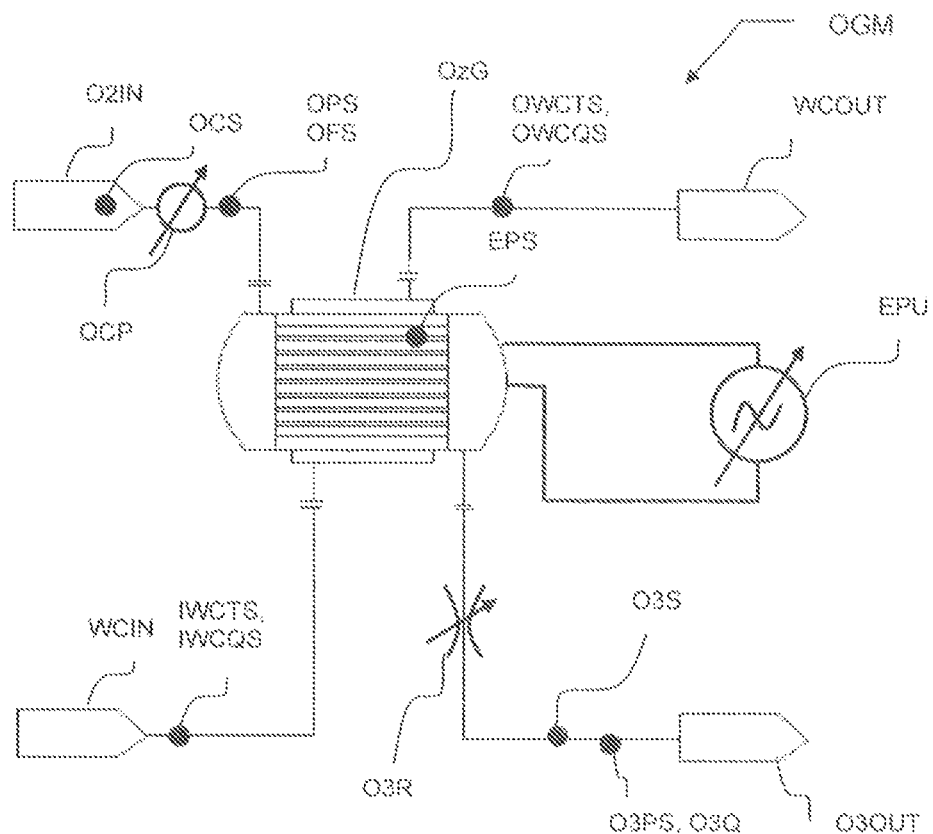
FIG. 1 represents a schematic diagram of an ozone generating machine according to the invention.
Figure 3:
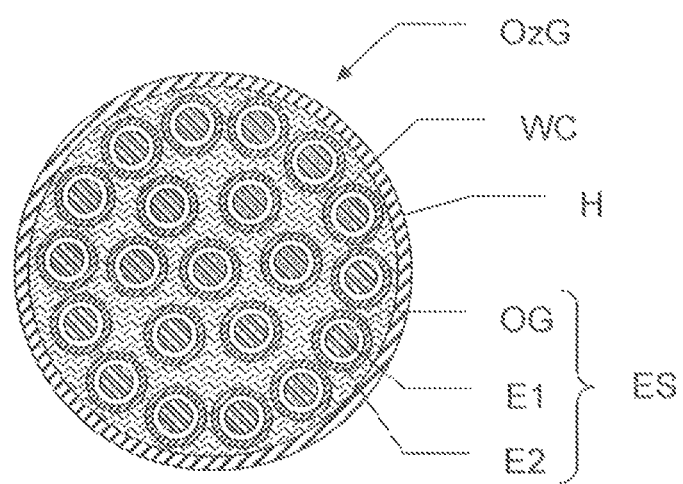
FIG. 3 represents a cross section of an ozone generator of the ozone generating machine of FIG. 1.

FIG. 1 represents a simplified ozone generating machine OGM comprising an ozone generator OzG where a plurality of electrodes sets ES are placed within a housing H, as shown on FIG. 3. Each electrodes set comprises two electrodes E1 and E2, separated by an ozonizing gap OG, and a dielectric layer (not shown on figures for clarity). The ozone generating machine OGM comprises also an electric power unit EPU for supplying electric current to each of the electrodes sets. Each ozonizing gap OG is connected upstream to a gas inlet O2IN of the ozone generator OzG for receiving a gas containing dioxygen, and downstream to a gas outlet O3OUT for exhausting gas containing ozone, when the ozone generating machine is operated.

In order to create a gas flow in the ozonizing gaps OG, the ozone generating machine comprises an oxygen circulation pump OCP, which is designed to set a specific gas feed flow and a specific gas feed pressure in the ozone generator OzG. When electric power is supplied to the electrodes and gas flow is established, electric discharges occurs in the ozonizing gap OG between the electrodes allowing corona affect, and a portion of oxygen supplied at the gas inlet O2IN is transformed into ozone, which is exhausted at the gas outlet O3OUT in a given amount.

To ensure stable conditions during production of ozone, a cooling circuit is comprising a cooling path within the ozone generator OzG, so that a cooling liquid can flow through the ozone generator OzG, to cool directly each of the electrodes sets ES. FIG. 3 shows that cooling water WC is present in the ozone generator OzG. The ozone generator comprises an inlet of water cooling WCIN, and an outlet of water cooling WCOUT.

Typically, the ozone generating machine OGM can be operated in the following ranges:

(i) range of power density: [0.1 to 10] kW per square meter of electrode (ii) range of electric current frequency: [10 to 30000] Hz (iii) range of upper limit of peak voltage: [2 to 20] kV (iv) Ozone concentration at the gas outlet: 1-16% by weight (v) Range of absolute pressure of feed gas, [0.5 bar(a)-6 bar(a)]

It might be desired that Nitrogen ($N_2$) and/or Argon (Ar) is present in the feed gas at least with a concentration of: 0.1-5% by weight, and the rest is dioxygen. Alternatively, one can supply air to the ozone generator.

The ozone generating machine OGM is also equipped with adequate sensors to monitor and check the ozone production, and the machine can comprise, as shown on FIG. 1 an oxygen concentration sensor OCS, an oxygen pressure sensor OPS, an oxygen flow sensor OFS, an ozone concentration sensor O3S, an ozone pressure sensor O3PS, an ozone circulation flow sensor O3Q, an inlet water cooling temperature sensor IWCTS and an outlet water cooling temperature sensor OWCTS, an inlet water cooling flow sensor IWCQS and an outlet water cooling flow sensor OWCQS, electrode power measurement means EPS with for example an electrode intensity sensor, an electrode voltage sensor, and a frequency sensor.

The production of ozone is adjustable according to user requirements, and typically, the electric power unit EPU is arranged to adjust the electric power supplied to the electrodes E1, E2. One might adjust the electric current voltage (also called current amplitude, or peak voltage) and/or the electric current frequency. It is also possible to adjust the gas feed flow, so that the oxygen circulation pump OCS is able to vary the circulation flow. Alternatively or in addition, it is possible to implement a flow regulator O3R along the gaseous path to set the gas feed flow (and by way of consequence the gas exhaust flow) at a particular value. Another parameter subjected to adjustment is the temperature of the ozone generator, and for this, it is possible to adjust the water cooling temperature.

All in all, it is possible to adjust the electric power supplied to the electrodes, and at least one of a plurality of process parameters comprising feed gas flow, electric current frequency, electric current voltage, cooling temperature of the ozone generator, to adjust the amount of generated ozone at the gas outlet O3OUT of the ozone generator.

During production of ozone, it is possible to adjust the electric power and some other parameters to modify the amount of ozone generated in the ozone generator. In addition to these adjustments, it is proposed also to adjust the gas feed pressure, to place the ozone generator OzG in optimized production conditions.

To enable this, the method proposes to adjust, simultaneously to the change of the electric power and the other process parameter(s), or within a predetermined operating time, the gas feed pressure, by continuously monitoring the values of the electric power and the other process parameter(s).

Then, several possibilities exist to manage the adjustment of gas feed pressure.

A first option is to calculate a derivative with respect to feed gas pressure of a model predicting a performance of the ozone generator based on feed gas pressure, electric current power and said at least one of the said process parameters, to determine an optimum feed gas pressure leading to an optimized efficiency of the ozone generator operated with the adjusted value of electric current power and said at least one adjusted process parameter. Then, setting the gas feed pressure to the calculated value leads to improve the efficiency of ozone production, leading to costs savings, either on raw material, or on energy cost.

As an example of model, one might use the following formula to calculate the machine efficiency in relation to the ozone concentration, feed gas pressure, power density, cooling water temperature and frequency of the electric current:

$$\eta(c,p,q,T,f) = 9.234E+00 + 2.124E-01 \times c + 2.451E+00 \times p + 30.072E-01 \times q + 2.568E-01 \times T + 1.688E-03 \times f + 0.000E+00 \times c \times p - 1.774E-01 \times c \times q - 2.679E-02 \times c \times T + 0.000E+00 \times c \times f + 9.869E-01 \times p \times q + 0.000E+00 \times p \times T - 1.502E-03 \times p \times f - 3.585E-02 \times q \times T + 3.888E-04 \times q \times f + 0.000E+00 \times T \times f - 4.680E-02 \times c^2 - 1.238E+00 \times p^2 - 2.777E-01 \times q^2 - 1.873E-03 \times T^2 + 1.000E-08 \times f^2$$

where:

c=ozone concentration (% by weight)

p=feed gas pressure (bar-a)

q=power density ($kW/m^2$)

T=cooling water temperature (° C.)

f=frequency of the electric current supplied to the ozone generator (Hz).

Such a model is typically determined by running a measurement campaign according to a design of experiments (DoE) measurement plan. To determine the coefficients of the model describing the physical behaviour of the technology with changing variables, a prototype for each new technology or a machine of existing technology is connected to process control and measurement instrumentation, preferably with high precision/accuracy. Subsequently, a measurement plan with five variables according to the rules of design of experiments is generated where all five variables are varied over the required range [Ref: Myers, Raymond H. Response Surface Methodology. Boston: Allyn and Bacon, Inc., 1971]. This range could be, as an example:

$c \in [1;5]$%-wt $p \in [1;2]$ bar-a $q \in [0.5;2.5]$ $kW/m^2$ $T \in [5;40]$° C.

$f \in [500;1000]$ Hz.

Subsequently, a mathematical function suitable to model the physical behaviour of the system in the required range of values for each variable, in our case a fully quadratic polynomial of the form $$\eta_\square(c, p, q, T, f) = a0 + a1 \times c + a2 \times p + a3 \times q + a4 \times T + a5 \times f + a6 \times c \times p + a7 \times c \times q + a8 \times c \times T + a9 \times c \times f + a10 \times p \times q + a11 \times p \times T + a12 \times p \times f + a13 \times q \times T + a14 \times q \times f + a15 \times T \times f + a16 \times c2 + a17 \times p2 + a18 \times q2 + a19 \times T2 + a20 \times f2,$$

is chosen. After measuring a sufficient number of variable combinations a linear regression analysis of the recorded dataset is performed in order to determine the exact values of all coefficients as (i=0 . . . 20).

According to this first option, the optimum gas feed pressure is predicted with accuracy and the setting of the machine parameters to the new values leads directly and quickly to the optimized production of ozone. One should note that some coefficients are zero, this is because it depends from a specific technology. It has to be kept in mind that for another technology, e.g. different gap width, other electrode materials, or different generator geometry, the model coefficients will be different, so that a standard step is to perform or re-perform such measurement campaign to determine the adequate model/coefficients. It should be also noted that other mathematical functions, included but not limited to polynomials of different order, logarithmic or exponential functions, power functions, or combinations thereof could be used to predict the efficiency. However, for each implementation of an ozone generator using a dielectric barrier discharge it will be possible to find a suitable mathematical function to generate a fitted curve to predict the efficiency according to the procedure stated above.

However, it is also possible to use deep neural networks being able, after a learning phase, to predict the optimized value for gas feed pressure after a change in the set up of electric power and another process parameter. In this case, the model is purely empirical, as built during the learning phase during which the deep neural networks store the production parameters, changes and consequences in the production data (amount of generated ozone). In another alternative, it is also possible to drive the gas feed pressure change by using fuzzy logic to build empirical models.

In a second option, it is possible to screen the range of gas feed pressure after a change in the set up of electric power and at least one other process parameter, according to a trial and error method. In this case, an ozone yield is calculated (based on the amount of generated ozone and electric power consumed) and monitored at least before and after the gas feed pressure change. If the gas feed pressure leads to a decrease of ozone yield, then the gas feed pressure is changed another time, either to the previous value to restore the previously better production conditions, or to another value, to check if better conditions might be found. The aim is to optimize the machine efficiency by screening the gas feed pressure.

Several procedures can be followed in this second option, such as a screening from a minimal pressure to a maximum pressure, and comparison of results to set the feed gas pressure to the point having the greatest efficiency. It is also possible, to plan after an adjustment of electric power and of the said at least other process parameter a systematic decrease of feed gas pressure and an increase of feed gas pressure to determine first the trend to follow in order to maximize the efficiency of the ozone generating machine. Of course, the method will maintain the feed gas pressure at the level determined either to have at minimum an increase of ozone yield, or to have the highest possible ozone yield.

It is also possible to mix the first option (calculation to predict the optimum gas feed pressure) and second option (adjustment of feed gas pressure and comparison of before/after efficiency to decide for further adjustment) to minimize the iterations of gas feed pressure adjustments.

Figure 2:
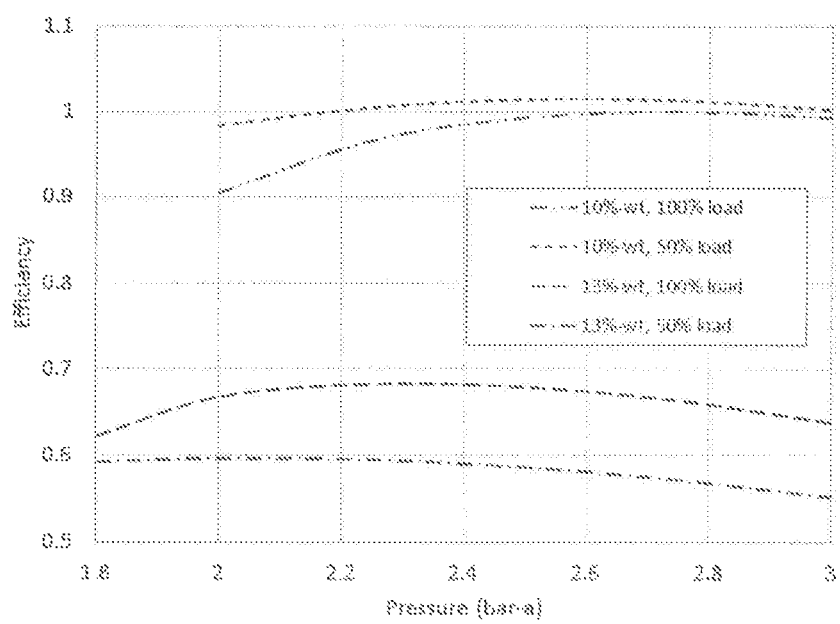
FIG. 2 represents example of curves of efficiency of the ozone generating machine of FIG. 1.

FIG. 2 shows curves of efficiency of the ozone generating machine OGM of FIG. 1, when gas feed pressure is adjusted as per the present method. The curves show relative efficiencies, baseline being the production point where ozone concentration is 10% by weight, 100% load, at 2.8 bar-a.

A first case shows the effect on the efficiency when a first ozone amount is generated (10% by weight), during production at full capacity of the machine (100% load) and during production at half capacity of the machine (50% load). This case is represented by the two upper curves (the small dots line and the two dots chain line).

In this case (10% by weight of ozone generated), the top curve (small dots line) shows that optimum feed gas pressure is about 2.6 bar-a (absolute pressure) when the machine is operated at 50% of its capacity. When the load is increased to full capacity, the second curve (two dots chain line) show that the optimum feed gas pressure is about 2.75 bar-a (absolute pressure). When the production (amount of generated ozone) is increased with same ozone concentration of 10% by weight at the gas outlet of the ozone generator, it is advantageous to increase the feed gas pressure to save a few points of efficiency.

A second case is also represented, when the concentration of generated ozone is 13% by weight at the gas outlet O3OUT of the ozone generator OzG. This case is represented by the two lower curves (large dots line, and one dot chain line).

In this case (13% by weight of ozone generated), the lowest curve (one dot chain line) shows that optimum feed gas pressure is about 2.1 bar-a (absolute pressure) when the machine is operated at 50% of its capacity. When the load is increased to full capacity, the second curve from bottom (large dots line) show that the optimum feed gas pressure is about 2.35 bar-a (absolute pressure). When the production (amount of generated ozone) is increased with same ozone concentration of 13% by weight at the gas outlet of the ozone generator, it is advantageous to increase the feed gas pressure to save a few points of efficiency.

It is of course understood that obvious improvements and/or modifications for one skilled in the art may be implemented, still being under the scope of the invention as it is defined by the appended claims.

What is claimed is:

1. A method for producing ozone in an ozone generating machine (OGM) comprising at least two electrodes (E1, E2) separated by an ozonizing gap (OG) and a dielectric layer, and located in an ozone generator (OzG) comprising at least a gas inlet (O2IN) for receiving a feed gas containing dioxygen, and a gas outlet (O3OUT) for exhausting gas comprising ozone, the method comprising the steps of:
 supplying the feed gas containing dioxygen at the gas inlet (O2IN) of the ozone generator (OzG), at a first feed gas flow rate and first feed gas pressure,
 supplying an alternating electric current to said at least two electrodes (E1, E2) of the ozone generator (OzG) so as to create electric discharges in the ozonizing gap (OG), to generate a given amount of ozone at the gas outlet (O3OUT) of the ozone generator (OzG),
 adjusting an electric current power density and at least one process parameter selected from a plurality of process parameters comprising: (i) feed gas flow, (ii) frequency of the alternating electric current, (iii) voltage of the alternating electric current, or (iv) cooling temperature of the ozone generator (OzG), to adjust the amount of generated ozone at the gas outlet (O3OUT) of the ozone generator (OzG),
 characterized in that the method comprises, during ozone production, the steps of:
 monitoring electric power and the at least one process parameter, adjusting the first feed gas pressure to a second feed gas pressure in response to the adjustment of at least one process parameter.

2. The method according claim 1, wherein the step of adjusting the first feed gas pressure to the second feed gas pressure comprises:
a step of calculating a derivative with respect to feed gas pressure of a model predicting a performance of the ozone generator (OzG) based on the first feed gas pressure, the electric current power density and said at least one of the said process parameters, to determine an optimum feed gas pressure leading to an optimized efficiency of the ozone generator (OzG) operated with the adjusted value of the electric current power density and said at least one adjusted process parameter, and
adjusting the first feed gas pressure to the second feed gas pressure to reach the optimum gas feed pressure within the ozone generator (OzG).

3. The method according to claim 1, further comprising a step of monitoring the generated amount of ozone at the gas outlet (O3OUT) of the ozone generator (OzG) by measuring an ozone concentration and/or measuring a flow of gas flowing through the ozone generator (OzG).

4. The method according to claim 2, wherein the steps of calculating the optimum feed gas pressure and adjusting the first feed gas pressure to the second feed gas pressure are performed simultaneously to, or within a predetermined operating time following a change power of the alternating electric current or the at least one process parameter.

5. The method according to claim 1, wherein:
during the step of adjusting the at least one process parameter, only the frequency of the alternating electric current and the feed gas flow are adjusted, and wherein:
an increase of the frequency of the alternating electric current leads to an increase of the first feed gas pressure, and a decrease of the electric current frequency of the alternating electric current leads to a decrease of the first feed gas pressure.

6. The method according to claim 1, wherein:
during the step of adjusting the electric current power density and at least one process parameter, only the electric current voltage and the feed gas flow are adjusted, and wherein:
an increase of the electric current voltage leads to an increase of the first feed gas pressure, and a decrease of the electric current voltage leads to a decrease of the first feed gas pressure.

7. The method according to claim 1, wherein the first feed gas pressure in the ozone generator (OzG) is varied to the second feed gas pressure within a range of 0.5 bar(a)-6 bar(a).

8. The method according to claim 1, further comprising the steps of:
monitoring the generated amount of ozone,
monitoring the feed gas pressure,
monitoring an amount of electricity consumed,
calculating and monitoring an ozone yield based on the generated amount of ozone and the amount of electricity consumed,
comparing the ozone yield before and after the step of adjusting the first gas feed pressure to the second gas feed pressure, and
adjusting the second feed gas pressure to a third feed gas pressure if ozone yield is decreased so as to optimize the ozone yield.

9. The method according to claim 8, further comprising the step of further adjusting the third feed gas pressure if ozone yield is increased or is the same after the step of adjusting the second gas feed pressure to the third feed gas pressure, so as to further increase the ozone yield.

10. The method according to claim 8, further comprising the step of maintaining the third feed gas pressure if ozone yield is increased or is the same after the step of adjusting the second gas feed pressure to the third gas feed pressure.

* * * * *